United States Patent [19]
Lederich et al.

[11] Patent Number: 5,955,207
[45] Date of Patent: Sep. 21, 1999

[54] STRUCTURAL PANEL HAVING BORON REINFORCE FACE SHEETS AND ASSOCIATED FABRICATION METHOD

[75] Inventors: Richard J. Lederich, Des Peres, Mo.; Raymond J. Tisler, Fullerton, Calif.

[73] Assignee: McDonnell Douglas Corporation, St. Louis, Mo.

[21] Appl. No.: 08/977,473

[22] Filed: Nov. 24, 1997

[51] Int. Cl.$^6$ ........................................ B32B 1/00
[52] U.S. Cl. .......................... 428/660; 148/527; 148/516
[58] Field of Search ........................... 428/660; 228/157; 148/527

[56] References Cited

U.S. PATENT DOCUMENTS

| | | |
|---|---|---|
| 3,924,793 | 12/1975 | Summers et al. . |
| 3,927,817 | 12/1975 | Hamilton et al. . |
| 4,217,397 | 8/1980 | Hayase et al. . |
| 4,304,821 | 12/1981 | Hayase et al. . |
| 5,024,369 | 6/1991 | Froes et al. ............................. 228/157 |
| 5,768,679 | 6/1998 | Taguchi et al. ......................... 428/548 |

*Primary Examiner*—Deborah Jones
*Assistant Examiner*—Darlene David
*Attorney, Agent, or Firm*—Alston & Bird LLP

[57] ABSTRACT

The face sheet is formed of a titanium alloy which includes boron that can be superplastically formed and diffusion bonded to form a structural panel. The structural panel generally includes a pair of face sheets that are disposed on and bonded to opposite sides of a metallic core. By forming at least one of the face sheets of a titanium alloy which includes boron, such as between about 0.2 weight percent and about 2 weight percent of boron, the resulting structural panel is stiffened without any corresponding increase in weight relative to structural panels formed of conventional titanium alloys. Preferably, powdered titanium diboride ($TiB_2$) is added to a titanium alloy charge that is subsequently formed into a boron reinforced titanium alloy sheet. During the forming process, the $TiB_2$ reacts to produce TiB reinforcements that are scattered throughout the metal matrix to increase the modulus and correspondingly stiffen the resulting face sheet.

14 Claims, 4 Drawing Sheets

STRUCTURAL PANEL HAVING BORON REINFORCE FACE SHEETS AND ASSOCIATED FABRICATION METHOD

FIELD OF THE INVENTION

The present invention relates generally to superplastically formable face sheets for structural panels and, more particularly, to boron reinforced face sheets and an associated fabrication method.

BACKGROUND OF THE INVENTION

In a number of applications, such as the aerospace and automobile industries, structural parts or structural panels are subjected to large loads which produce relatively large stresses and forces on the panels. For example, the upper wing sections of an aircraft are typically compression loaded and may be subjected to crippling and buckling loads. Accordingly, the materials which form the structural parts or panels as well as the resulting structural part or panel must have sufficient strength and stiffness to withstand the anticipated loads.

Traditionally, solid structures have been fabricated which provide sufficient strength. However, solid parts and built-up structures are generally relatively heavy which may limit their utility, such as by undesirably increasing the weight of the resulting aircraft. Thus, materials which can be superplastically formed and diffusion bonded are preferred over materials which are utilized primarily in the production of solid structures.

Superplasticity is the characteristic demonstrated by certain metals and alloys to develop unusually high tensile elongations with minimum necking when deformed within a limited temperature and strain rate range. This characteristic, peculiar to certain metals and metal alloys, has been known in the art as applied to the production of metallic structures as described in detail below. It is further known that at the same superplastic forming temperatures, the metals and metal alloys which exhibit superplasticity can be diffusion bonded with the application of sufficient pressure at contacting surfaces.

Various types of metallic structures have been superplastically formed and diffusion bonded. For example, in a process typically referred to as a three-sheet process, a metallic structure is formed from three metallic sheets, typically an inner sheet and a pair of opposed face sheets. For example, the three-sheet process and the resulting metallic structure is disclosed by U.S. Pat. No. 3,924,793 which issued Dec. 9, 1975 to Summers et al. and is assigned to British Aircraft Corporation Limited; and U.S. Pat. No. 3,927,817 which issued Dec. 23, 1975 to Hamilton, et al. and is assigned to Rockwell International Corporation (hereinafter the '793 and the '817 patents, respectively).

Both the '793 patent and the '817 patent describe methods for superplastically forming metallic sandwich structures from metallic sheets which are joined at selected areas and expanded superplastically. According to the three-sheet method disclosed by these patents, however, the metallic sheets are generally bonded, such as by diffusion bonding, prior to any superplastic forming operations. In particular, the inner sheet is bonded to the outer face sheets. Thereafter, by applying tensile stress to the face sheets, such as by applying gas pressure between the face sheets, the inner sheet is drawn outwardly with the expanding face sheets to which it is joined during the superplastic forming operation.

The three-sheet process generally produces a metallic sandwich structure which has a truss core structure. The truss core structure produced by the three-sheet process does not typically include significant transverse stiffening, but, instead, includes one or more canted elements which extend between the opposed face sheets at an angle which is not perpendicular to the face sheets. In other words, the angle defined between the canted element and a face sheet is less than 90°.

In order to produce structural panels which include, among other things, increased transverse strength or stiffness, another superplastic forming and diffusion bonding process, typically termed a four-sheet process, has been developed. An exemplary four-sheet process is disclosed in U.S. Pat. Nos. 4,217,397 and 4,304,821 (hereinafter the '397 and the '821 patent, respectively), both of which issued to Hayase, et al. and are assigned to McDonnell Douglas Corporation. The respective disclosures of both the '397 and '821 patents are hereby incorporated by reference. In general, the '397 patent discloses a four-sheet metallic sandwich structure having a pair of core sheets and a pair of opposed face sheets, while the '821 patent discloses the corresponding method of fabricating the structure disclosed in the '397 patent.

More specifically, the '397 patent discloses a metallic sandwich structure in which metallic core sheets are joined by an intermittent weld. The joined core sheets are thereafter sealed by a continuous weld, such as along corresponding edge portions, to form an expandable envelope. Following the placement of the joined core sheets in a limiting structure, such as a containment die, an inert gas is injected to interior portions of the joined core sheets to thereby superplastically form or expand the core sheets. In particular, by applying appropriate pressure and temperature to the assembled structure, the core sheets are expanded against and diffusion bonded to the surrounding face sheets, thereby producing the resulting structural panel. The core configuration of the resulting structural panel is generally defined by the intermittent weld pattern, as described in detail in the '397 and '821 patents.

Regardless of the type of superplastic forming and diffusion bonding process, both the core sheets and the face sheets are generally formed of titanium alloys, such as Ti—6Al—4V, that are relatively ductile and have a refined equiaxed microstructure and, are therefore, formable during a superplastic forming process. As known to those skilled in the art, Ti—6Al—4V contains 6% aluminum by weight and 4% vanadium by weight. Other common titanium alloys for superplastic forming applications are Ti—6Al—2Cr—2Mo—2Sn—2Zr, Ti—4Al—4Mo—2Sn—0.5Si and Ti—6Al—6V—2S. Although conventional alloys are sufficiently ductile for superplastic forming operations, an increasing number of applications are demanding components, such as structural panels, having increased strength and/or stiffness while weighing the same or less than the same components fabricated from these conventional titanium alloys. For example, the face sheets of an aircraft wing must withstand the majority of the loading forces. As a result, the stiffness or modulus of elasticity (hereinafter "modulus") of the face sheets is extremely important in any attempt to increase the stiffness of the aircraft wing while decreasing or at least not increasing the weight of the aircraft wing.

Therefore, while ductility remains an important material property for components that are superplastically formed, the modulus of elasticity is also becoming of increasing importance in a number of applications that require components having increased stiffness without a corresponding increase in weight. In this regard, Ti—6Al—4V has a modulus of about $16.5 \times 10^6$ lb/in$^2$. Of the conventional titanium alloys, Ti—62S has the highest modulus of about $17.3 \times 10^6$ lb/in$^2$. While the modulus of these conventional alloys is sufficient for many applications, an increasing number of applications are demanding stiffer materials, i.e., materials having an even greater modulus. In addition, the processes for forming sheets of monolithic titanian alloys require relatively close control of the temperature to maximize formability and to minimize undesirable coarsening. Coarsening decreases further formability and also causes the as-formed properties to be weaker and less ductile. Generally, a temperature excursion of more than 30° F. above the optimal superplastic forming temperature will result in coarsening.

SUMMARY OF THE INVENTION

It is therefore an object of the present invention to provide a structural panel which includes a superplastically formable titanium alloy face sheet with improved stiffness.

It is another object of the present invention to provide a structural panel which includes a superplastically formable titanium alloy face sheet which has a stable microstructure that is resistant to coarsening during forming.

It is a further object of the present invention to provide a method for fabricating a titanium alloy face sheet with improved stiffness and reduced coarsening that can be subsequently superplastically formed.

These and other objects are provided, according to the present invention, by a face sheet made of a titanium alloy which includes boron that can be superplastically formed and diffusion bonded to form a structural panel. The structural panel generally includes a pair of face sheets that are disposed on and bonded to opposite sides of a metallic core. By forming at least one of the face sheets of a titanium alloy which includes boron, the resulting structural panel of the present invention is stiffened without any corresponding increase in weight relative to structural panels formed of conventional titanium alloys.

A face sheet of the present invention preferably includes between about 0.2 weight percent and about 2 weight percent of boron and, more preferably, between about 0.4 weight percent and about 1.1 weight percent of boron. For example, the face sheet of one advantageous embodiment includes about 0.7 weight percent of boron. As a result of the increased modulus of boron relative to conventional titanium alloys such as Ti—6Al—4V and Ti—62S, the resulting face sheet is stiffened in comparison to face sheets formed of conventional titanium alloys.

According to one advantageous embodiment, both face sheets are reinforced with boron. In contrast, the metallic core of the structural panel is typically free of boron.

According to another aspect of the present invention, a method a fabricating a boron reinforced titanium alloy face sheet is also provided. In this regard a charge of a titanium alloy, such as Ti—6Al—4V or Ti—62S, is initially provided. Titanium diboride (TiB$_2$), typically in a powder form, is then added to the titanium alloy charge prior to forming the charge into a titanium alloy sheets. The charge is preferably formed into a titanium alloy sheet by casting the charge into an ingot, forging the ingot into a plate, and thereafter rolling the plate so as to thin the plate into the resulting face sheet. During the forming step, the TiB$_2$ reacts to produce TiB reinforcements that are scattered throughout the metal matrix to stiffen the resulting face sheet.

Even though the boron reinforced titanium alloy face sheet of the present invention has increased stiffness relative to conventional face sheets, the boron reinforced titanium alloy has more than sufficient formability for superplastic forming and diffusion bonding applications. It has also been determined that the boron reinforcements promote grain stability and, correspondingly, prevent coarsening. As a result, the conditions, including the temperatures, at which the boron reinforced titanium alloy is processed are less restricted than the conditions under which conventional titanium alloys are processed, thereby yielding a larger processing window and reduced processing costs. Furthermore, TiB is an equilibrium in-situ product which is chemically compatible with a titanium-based metal matrix. Therefore, brittle intermetallic reaction products which form when non-in-situ reinforcements, such as SiC are added to a titanium-based metal matrix, do not form with TiB$_2$ additions

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

The boron reinforced face sheets 36 of the present invention will now be described in conjunction with a four sheet superplastic forming and diffusion bonding process. The four sheet superplastic forming and diffusion bonding process is described only for purposes of illustration since the boron reinforced faces sheets could be utilized with a variety of different metallic cores and a number of different superplastic forming and diffusion bonding processes, such as a three sheet superplastic forming and diffusion bonding process, without departing from the spirit and scope of the present invention.

Figure 1:
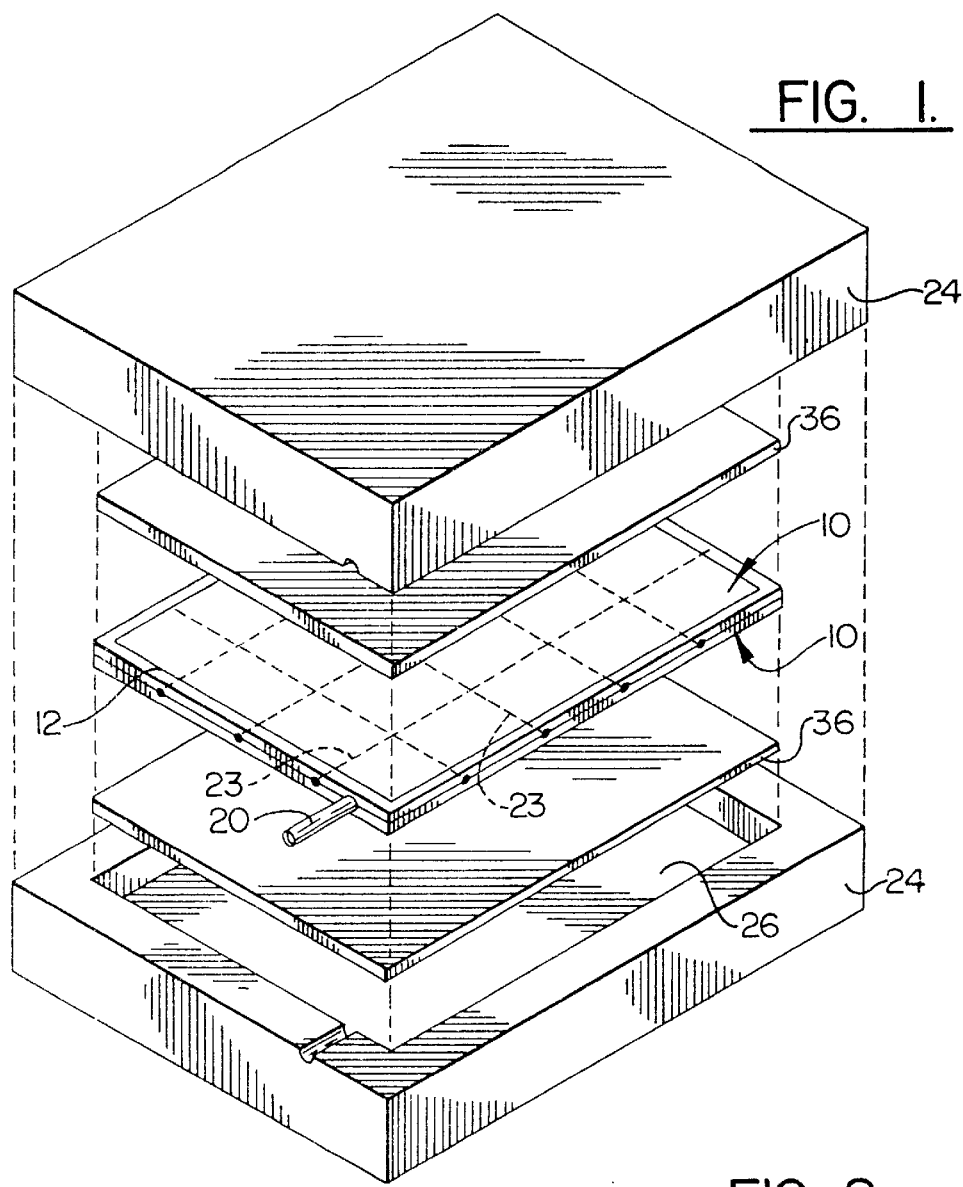
FIG. 1 is an exploded perspective view of an inflatable envelope assembly, first and second face sheets and an associated containment die prior to the superplastic formation of the inflatable envelope assembly and the opposed face sheets.

Referring now to FIG. 1, a structural panel includes a metallic core which has first and second metallic core sheets 10 according to one advantageous embodiment of the present invention is illustrated. The first and second metallic core sheets have superplastic properties, that is, the first and second metallic core sheets exhibit the characteristic of unusually high tensile elongation with minimum necking when deformed within a limited temperature range and strain rate range. As known to those skilled in the art, a number of materials demonstrate superplastic properties, such as conventional titanium alloys, including Ti—6Al—4V. The superplastic temperature range varies depending upon the specific material used, however, a temperature which is slightly below the phase transformation temperature of the specific material is preferable for superplastic forming operations. For example, titanium alloys generally exhibit superplastic properties for temperatures between about 1350° F. and about 1700° F. The preferred strain rate is typically determined experimentally for each configuration of the structural panel formed, however, the strain rate is generally approximately $5 \times 10^{-4}$ in./in./sec. for balanced or stable deformation of the structural panel. As also known to those skilled in the art, if the strain rate is too rapid, the material being deformed may blow out. Conversely, if the strain rate is too slow, the plasticity of the material being deformed may decrease or the rate of forming may be so slow that it is no longer economical.

In addition to the superplastic properties, the first and second metallic core sheets 10 are preferably capable of diffusion bonding. Diffusion bonding generally refers to the solid state joining of the surfaces of similar or dissimilar metals or metal alloys by applying heat and pressure for a length of time to cause commingling of the atoms at the joint interface. By way of distinction, fusion bonding or welding generally refers to the metallurgical joining or welding of the surfaces of similar or dissimilar metals by applying heat so as to cause the materials at the joined interface to reach the liquid or plastic state and to thereby merge into a unified whole.

Figure 2:
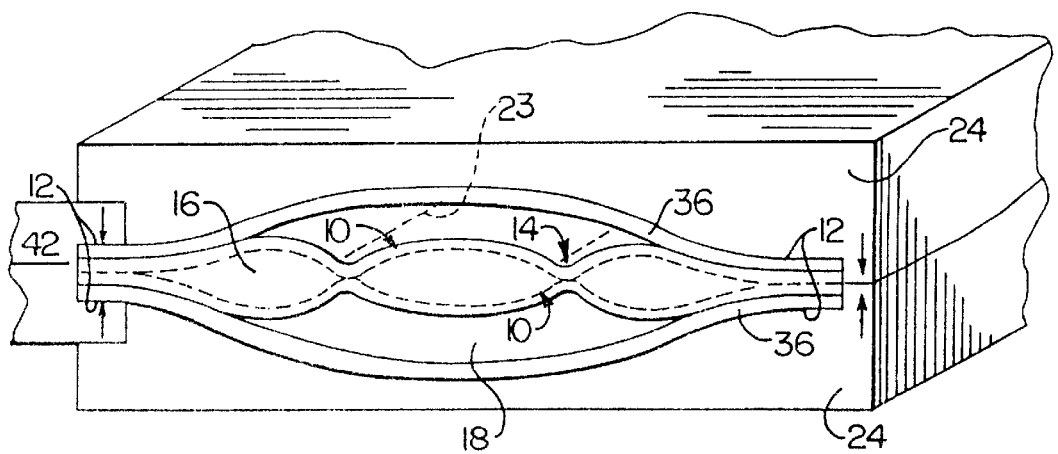
FIG. 2 is a fragmentary perspective view of the assembled structural panel disposed in the cavity defined by a containment die and having the respective edge portions of the sheets held in a fixed relationship by a root fitting.

As illustrated in FIGS. 1 and 2, the first and second metallic core sheets 10 are joined, such as by welding, along respective edge portions 12 to form an inflatable envelope assembly 14. The inflatable envelope assembly includes interior and exterior portions 16 and 18, respectively. In addition, the inflatable envelope assembly can include at least one port 20 for introduction of the forming gas, typically argon, into the internal portion thereof. As further illustrated in FIG. 1, interior portions of the first and second core sheets can also be joined by a discontinuous weld pattern 23 and 24. The discontinuous weld pattern can be formed in a variety of designs as described and illustrated in the '397 and '821 patents.

Further, while the inflatable envelope assembly 14 illustrated in FIG. 1 is comprised of first and second metallic core sheets 10, one or more additional core sheets can also be joined, such as by welding, along respective edge portions 12 to the first and second core sheets to form an inflatable envelope assembly having a plurality of interior portions 16. Preferably, a respective port 20 is defined in fluid communication with each interior portion such that fluid can be injected therein as discussed below. As described above, interior portions of an inflatable envelope assembly comprised of three or more metallic core sheets can also be joined by a discontinuous weld pattern 23 and 24 to produce a number of strengthening webs 44 as described in detail below. In particular, each pair of adjacent core sheets can be joined by the same weld pattern or two or more different weld patterns can be employed to join the various metallic core sheets.

The structural panel 40 also includes at least one and, more typically, a pair of metallic face sheets 36 positioned on opposite sides of the metallic core as shown in FIG. 1. According to the present invention, the face sheets are comprised of a titanium alloy that is reinforced with boron in order to increase the stiffness of the face sheet in comparison to conventional face sheets. Typically, any titanium alloy can be used, however, Ti—62S was selected since it has the highest modulus of the conventional titanium alloys. However, the face sheet can include other titanium alloys without departing from the spirit and scope of the present invention.

The addition of boron to a titanium alloy face sheet 36 increases its stiffness because a uniform dispersion of the fine stiff reinforcements are formed. It will be understood that the percentage of boron by weight can be varied depending upon the design criteria. However, the face sheet of one embodiment includes between about 0.2 weight percent of boron and about 2 weight percent of boron and, more preferably, between about 0.4 weight percent of boron and about 1.1 weight percent of boron. In this regard, the face sheet of one particularly advantageous embodiment is principally comprised of Ti—62S to which 0.7 weight percent of boron has been added.

For a boron reinforced titanium alloy comprised of Ti—62S reinforced with 0.7 weight percent of boron (Ti—62S—0.7B), the modulus of elasticity is between $18.5 \times 10^6$ and $19.5 \times 10^6$ lb/in$^2$. In contrast, the modulus of Ti—62S is about $17.3 \times 10^6$ lb/in$^2$ and the modulus of Ti—6Al—4V is about $16.5 \times 10^6$ lb/in$^2$. In other words, the modulus of the boron reinforced alloy Ti—62S—0.7B is 12 to 18% greater than the modulus of Ti—6Al—4V, and about 7 to 13% greater than the modulus of Ti—62S.

Since Ti—62S is a slightly lower density alloy then Ti—6Al—4V, the density-normalized modulus of Ti—62S—0.7B is 17 to 20% greater than the density-normalized modulus of Ti—6Al—4V. As a result, a face sheet 36 comprised of Ti—62S—0.7B having a predetermined size and stiffness will be approximately 10 to 13% lighter than a face sheet comprised of Ti—6Al—4V of the same predetermined size and stiffness. As a result, the boron reinforced titanium alloy face sheets of the present invention not only have increased stiffness, but may also be lighter than conventional titanium alloy face sheets.

Figure 5:
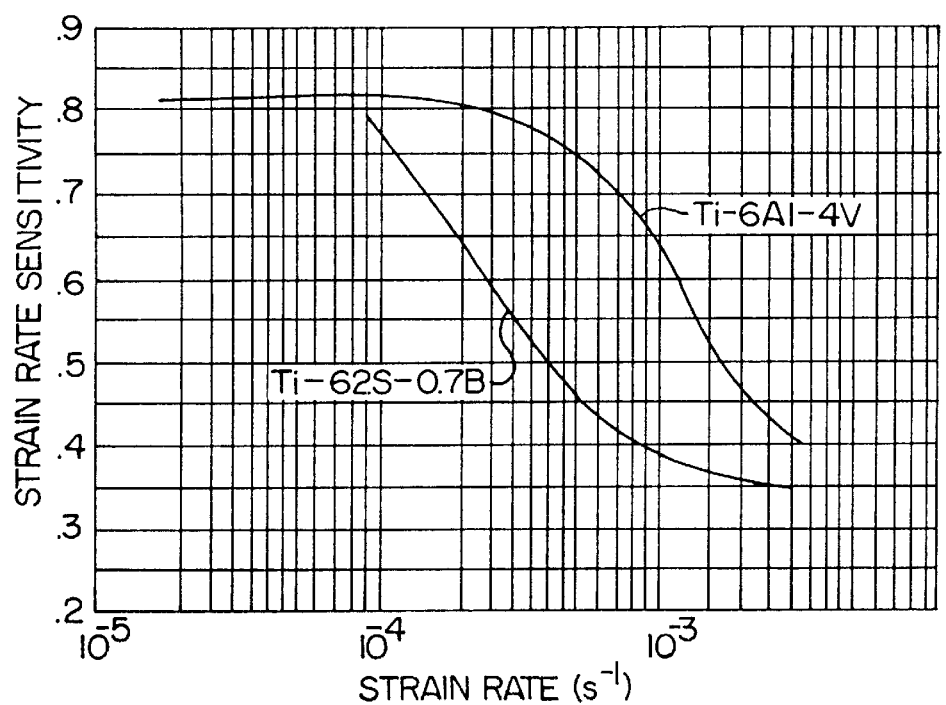
FIG. 5 is a graphical representation of the strain rate sensitivity as a function of the strain rate for Ti—6Al—4V and for Ti—62S—0.7B at a temperature of 1650° F.

It is noted that the boron reinforced titanium alloy face sheets 36 of the present invention are typically slightly less formable and capable of less elongation than conventional titanium alloy face sheets. However, the boron reinforced titanium alloy face sheets of the present invention are more than sufficiently formable the vast majority of, if not all, superplastic forming and diffusion bonding applications. In this regard, FIG. 5 depicts the relationship between strain rate sensitivity and strain rate for Ti—62S—0.7B and Ti—6Al—4V. As known to those skilled in the art, materials that are superplastically formable generally have a strain rate sensitivity between about 0.3 and about 0.7. As shown in FIG. 5, face sheets formed of Ti—62S—0.7B according to the present invention are sufficiently formable for superplastic forming applications at a number of strain rates. In addition, Ti—62S—0.7B is capable of an elongation of about 400% at strain rates between about $2\times10^{-4}$ s$^{-1}$ and about $5\times10^{-4}$ s$^{-1}$. As will be apparent to those skilled in the art, the 400% elongation exhibited by Ti—62S—0.7B is more than sufficient for most, if not all, superplastic forming face sheet applications.

Although the structural panel 40 of the present invention could include only a single boron reinforced titanium alloy face sheet 36, both face sheets are preferably reinforced with boron in order to further stiffen the resulting structural panel. Preferably, both face sheets are reinforced with the same weight percentage of boron such that both face sheets will have the same material properties. Although the metallic core sheets 10 could also be reinforced with boron, the metallic core is generally free of boron. As a result, the metallic core is capable of even greater amounts of superplastic deformation, while the boron reinforced titanium alloy face sheets increase the stiffness of the resulting structural panel in comparison to structural panels having conventional titanium alloy face sheets.

As illustrated in an exploded perspective view in FIG. 1, the inflatable envelope assembly 14 and the metallic face sheets are disposed in a containment die 24, such as a forming tool or a limiting fixture, such that the inflatable envelope assembly is sandwiched between the face sheets. The containment die defines a cavity 26 having a predetermined shape. For example, the predetermined shape can have a compound curvature and may, for example, define the leading edge of an aircraft wing.

Figure 3:
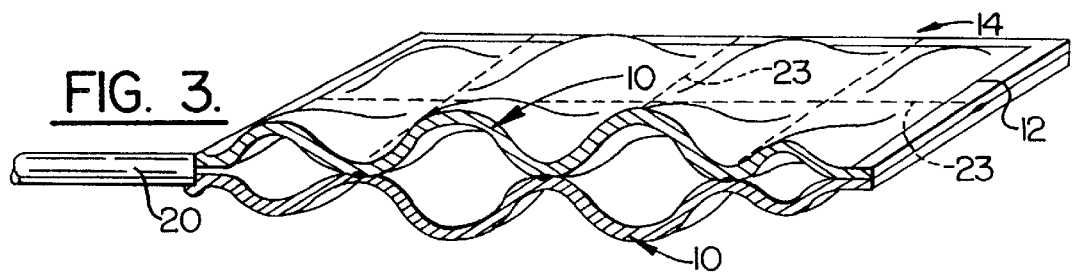
FIG. 3 is a fragmentary perspective view of the partially expanded inflatable envelope assembly of FIG. 2 that has been removed from the cavity defined by the containment die for purposes of illustration.

Once positioned with the containment die 24, edge portions 12 of the first and second metallic face sheets 36 are preferably joined, such as by welding, to edge portions of the inflatable envelope assembly 14 to form a pressure vessel between the first and second face sheets. Thereafter, a pressure differential is created between interior and exterior portions of the inflatable envelope assembly that is sufficient to subject the inflatable envelope assembly to strain within the predetermined strain range. The pressure differential is generally created by injecting fluid, such as an inert gas, through the port 20 defined in the inflatable envelope assembly, thereby increasing the fluid pressure within the internal portion of the inflatable envelope assembly. As known to those skilled in the art, fluid is also generally withdrawn or allowed to escape from the space between the inflatable envelope assembly and the first and second face sheets to further facilitate the superplastic deformation of the metallic core. Concurrent with the establishment of a pressure differential between interior and exterior portions of the inflatable envelope assembly, the inflatable envelope assembly is heated to a temperature within the superplastic temperature range of the material forming the inflatable envelope assembly. As therefore shown in FIGS. 2 and 3, the inflatable envelope assembly superplastically deforms to the predetermined shape defined by the cavity 26 of the containment die and, upon contacting the face sheets, diffusion bonds to the first and second metallic face sheets.

Figure 4:
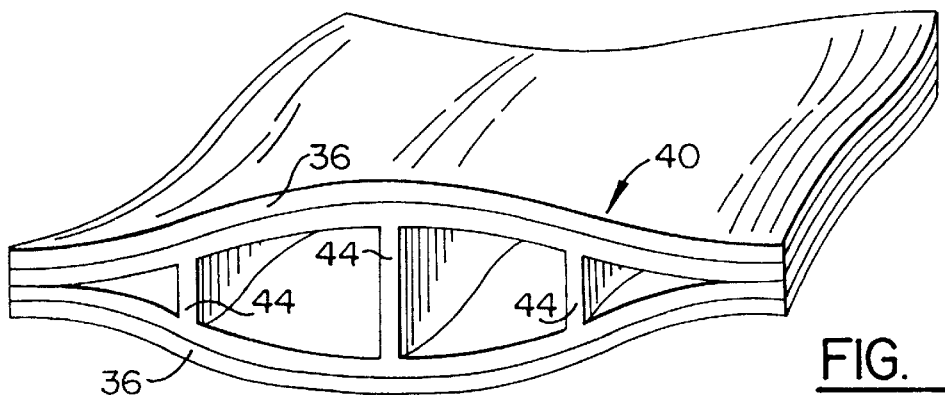
FIG. 4 is a fragmentary perspective view of a structural panel superplastically formed which includes a plurality of strengthening webs extending between the pair of metallic core sheets.

Accordingly, an integral structural panel 40 having the predetermined shape can be readily formed. As shown in FIG. 4 and as described in the '367 and '821 patents, the expansion of the first and second metallic core sheets 10 generally produces strengthening webs 44 extending between the portions of the first and second metallic core sheets which are joined by the discontinuous weld pattern 23 and 24. Accordingly, the strength of the resulting structural panel 40 is further enhanced by the strengthening webs extending between the opposed sides of the structural panel. However, the weight of the resulting structural panel is further minimized since the structural panel is generally hollow.

Figure 6:
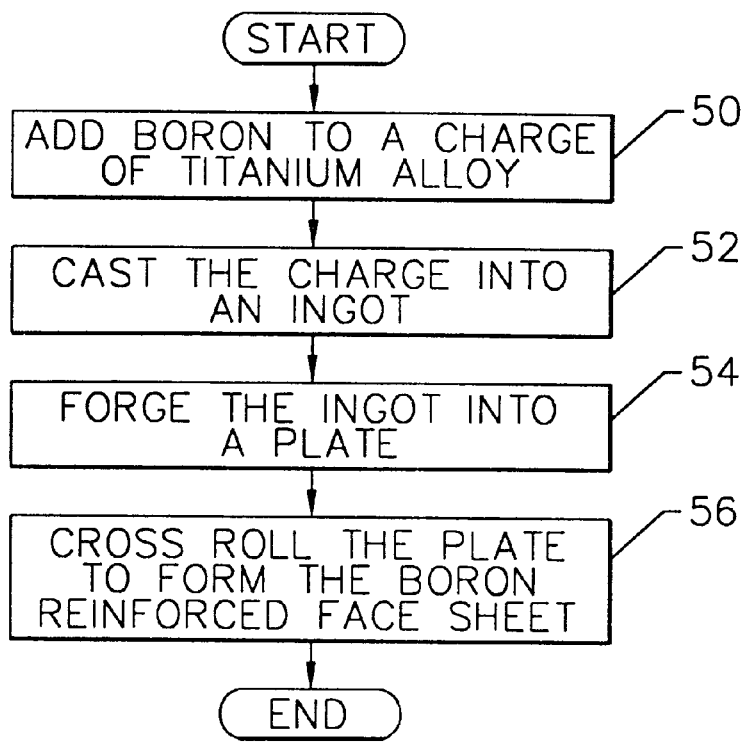
FIG. 6 is a flow chart illustrating the operations performed to fabricate a boron reinforced face sheet according to one advantageous aspect of the present invention.

The boron reinforced titanium alloy face sheets 36 of the present invention can be fabricated in a variety of manners. According to one advantageous aspect of the present invention depicted by FIG. 6, the boron reinforced titanium alloy face sheets are fabricated by adding boron to a charge of titanium alloy as shown in block 50. Preferably, titanium diboride (TiB$_2$) is added to the charge of titanium alloy and, more preferably, powdered TiB$_2$ is added to an at least partially molten charge of titanium alloy, such as Ti—62S.

Following the addition of the TiB$_2$ to the titanium alloy, the charge is formed into a titanium alloy sheet. Typically, the charge is cast into an ingot. See block 52. The ingot is then forged into a plate as shown in block 54. In one advantageous embodiment, a 75 pound ingot of Ti—62S that contains 0.7 weight percent of boron is forged at 2000° F. into a plate that has a thickness of 1.75 inches. Following the forging step, the plate is cross-rolled into the resulting face sheet 36 as shown in block 56. With reference to the exemplary plate having a thickness of 1.75 inches, the plate can be cross-rolled at 1825° F. to form a face sheet having a thickness of 0.60 inches. As will be apparent, the thicknesses of the plate and the resulting face sheet as well as the forging and rolling temperatures can be varied without departing from the spirit and scope of the present invention.

Figure 7A:
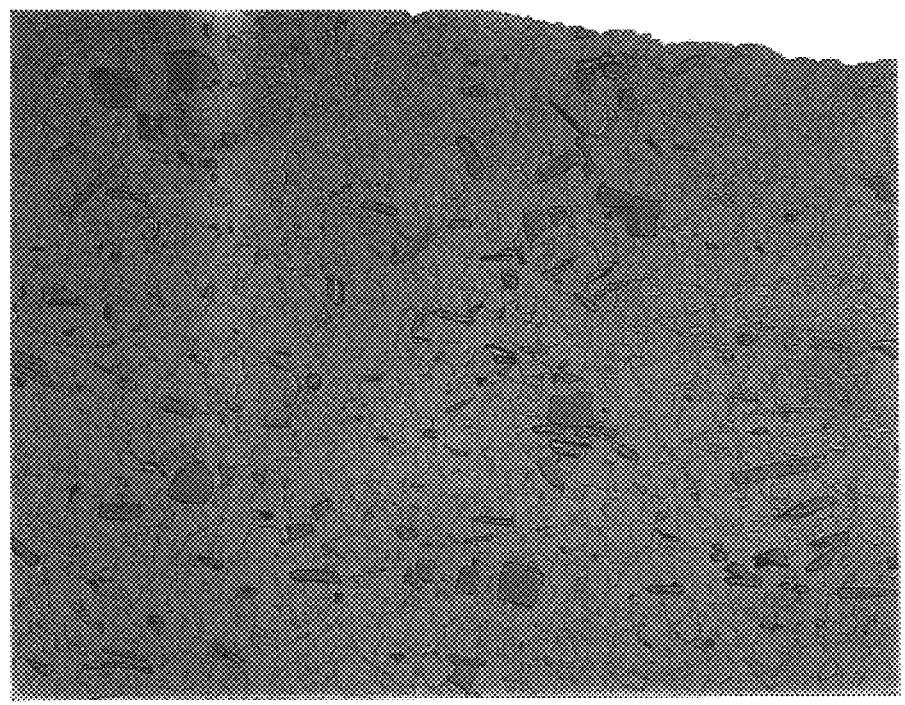
FIG. 7A is a photograph of the metallurgical microstructure of a face sheet containing TiB at a magnification of 500× according to one embodiment of the present invention taken in the direction normal to the plane of the face sheet.
Figure 7B:
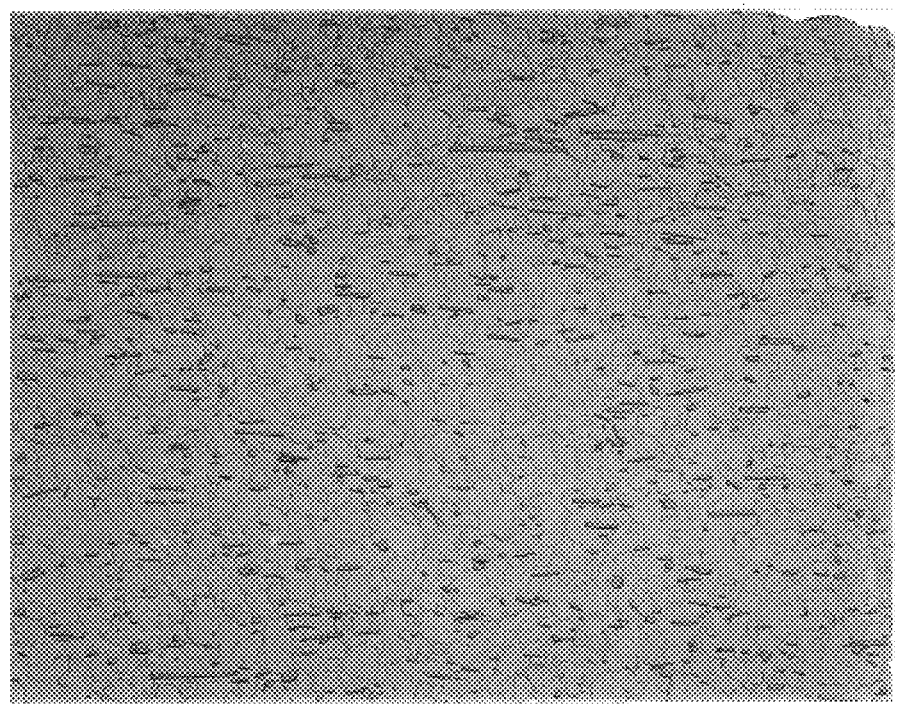
FIG. 7B is a photograph of the metallurgical microstructure of the face sheet depicted in FIG. 7A taken in the direction parallel to the plane of the face sheet (cross-sectional view) that is also at a magnification of 500×.

During the process of forming the charge into a face sheet, the TiB$_2$ reacts to produce TiB. The TiB is scattered throughout the resulting metal matrix so as to effectively reinforce the face sheet 36. In this regard, FIGS. 7A and 7B are photographs of the metallurgical microstructure of a boron reinforced face sheet of the present invention taken at a magnification of 500× in a direction normal to the plane of the face sheet and in a direction parallel to the plane of the face sheet, respectively. In the cast condition, the TiB particles are generally rodlike in shape. Cross rolling has the effect of flattening the TiB particles into disks (such as "poker chips"). Thus, the TiB reinforcements approach a spherical morphology when viewed in the normal direction (FIG. 7A) and as lines when viewed in the cross-sectional direction (FIG. 7B). Still referring to FIG. 7B, it is noted that the rolling action tends to deform and align the TiB reinforcements with one another which serves to further stiffen the resulting face sheet.

In addition to stiffening the resulting face sheet 36, the TiB reinforcements also promote grain stability and refinement. As a result, the TiB reinforcements reduce, if not eliminate, coarsening of the metal matrix. By significantly reducing or eliminating coarsening of the metal matrix, the addition of the TiB reinforcements permits the process of forming the charge into a face sheet to be conducted at higher temperatures, such as 1800° F., in comparison with the lower temperature range, such as 1600–1700° F., within which a charge of a conventional titanium alloy must be processed to form a face sheet that does not exhibit significant coarsening. By allowing the face sheets to be formed at higher temperatures, the face sheet fabrication process described above potentially has larger yields and lower processing costs, because of reduced edge cracking loss.

Further, the foregoing process does not create embrittling high temperature reaction products, such as those which typically occur when SiC particles are added to titanium alloys. Instead, the TiB reinforcements are equilibrium in-situ products that are chemically compatible with the metal matrix.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A structural panel comprising:

a metallic core having superplastic properties; and a pair of metallic face sheets having superplastic properties, said pair of metallic face sheets being bonded to and disposed on opposite sides of said metallic core to form an integral structural panel, wherein at least one of said metallic face sheets is comprised of a titanium alloy which includes boron to thereby stiffen the resulting structural panel.

2. A structural panel according to claim 1 wherein said at least one metallic face sheet comprises between about 0.2 weight percent and about 2 weight percent of boron.

3. A structural panel according to claim 2 wherein said face sheet comprises between about 0.4 weight percent and about 1.1 weight percent of boron.

4. A structural panel according to claim 3 wherein said face sheet comprises about 0.7 weight percent of boron.

5. A structural panel according to claim 1 wherein said titanium alloy is comprised of Ti—6Al—1.7Fe—0.7Si—0.12O reinforced with TiB.

6. A structural panel according to claim 1 wherein both said metallic face sheets are comprised of a titanium alloy which includes boron.

7. A structural panel according to claim 1 wherein both said metallic core is free of boron.

8. A face sheet of a structural panel having a metallic core surrounded by a pair of metallic face sheets, said face sheet comprising a titanium alloy reinforced with TiB such that the face sheet includes between about 0.2 weight percent and about 2 weight percent of boron to thereby stiffen the resulting face sheet.

9. A face sheet according to claim 8 comprising between about 0.4 weight percent and about 1.1 weight percent of boron.

10. A face sheet according to claim 9 comprising about 0.7 weight percent of boron.

11. A face sheet according to claim 8 wherein the titanium alloy is comprised of Ti—6Al—1.7Fe—0.7Si—0.12O reinforced with TiB.

12. A method of fabricating a face sheet of a structural panel having a metallic core surrounded by a pair of metallic face sheets, the method comprising the steps of:

providing a charge of a titanium alloy;

adding titanium diboride ($TiB_2$) to said charge of a titanium alloy; and forming said charge into a titanium alloy sheet following said adding step, wherein said $TiB_2$ reacts to produce TiB during said forming step in order to stiffen the resulting face sheet.

13. A method according to claim 12 wherein said adding step comprises adding $TiB_2$ powder to said charge of a titanium alloy.

14. A method according to claim 12 wherein said forming step comprises:

casting said charge of a titanium alloy into an ingot following said adding step;

forging said ingot into a plate; and rolling said plate to thereby thin said plate into the resulting face sheet.

* * * * *

UNITED STATES PATENT AND TRADEMARK OFFICE
CERTIFICATE OF CORRECTION

PATENT NO. : 5,955,207

DATED : September 21, 1999

INVENTOR(S) : Lederich et al.

It is certified that error appears in the above-identified patent and that said Letters Patent is hereby corrected as shown below:

Title page, item [54], line 2 and Column 1, line 2:

In the title, "REINFORCE" should read --REINFORCED--.

Signed and Sealed this

Eighteenth Day of April, 2000

Attest:

Attesting Officer

Q. TODD DICKINSON

Director of Patents and Trademarks